Figure 1:
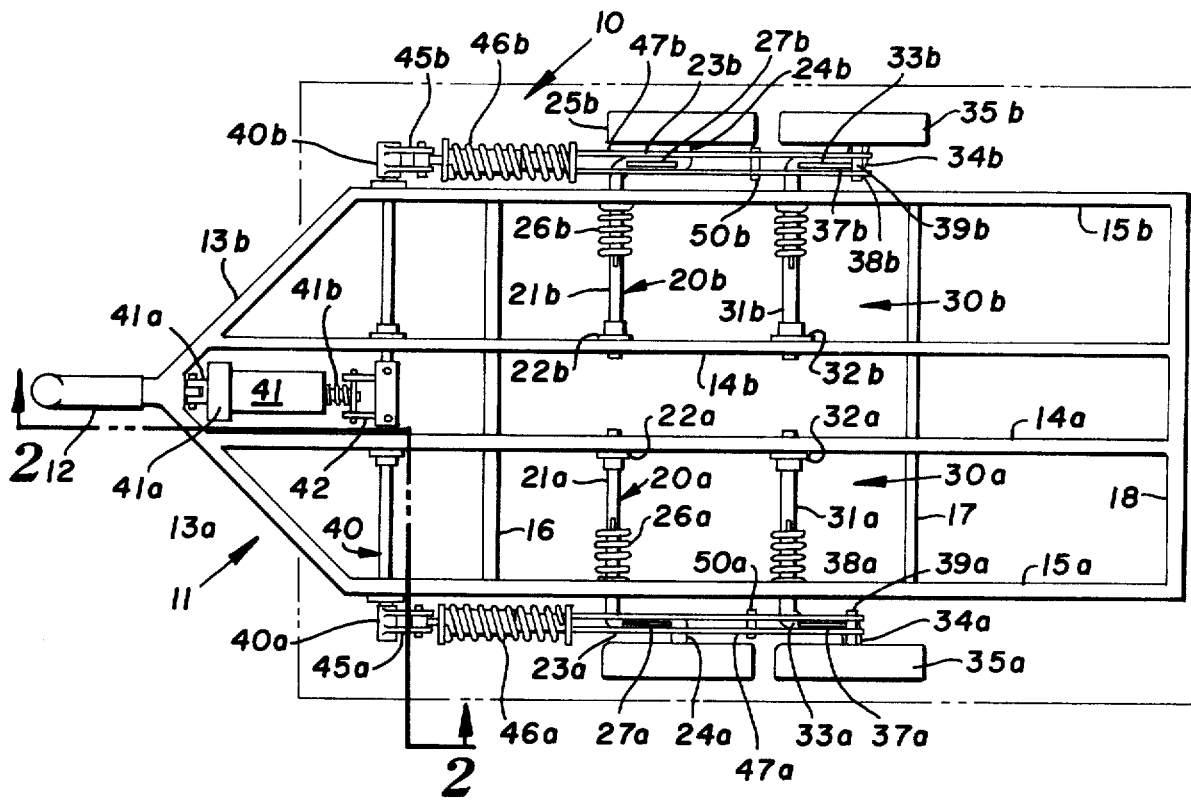

United States Patent [19]

Herrman

[11] 3,944,248
[45] Mar. 16, 1976

[54] SUSPENSION SYSTEM
[76] Inventor: Arthur L. Herrman, 8500 Penn Ave. South, Bloomington, Minn. 55431
[22] Filed: Nov. 29, 1974
[21] Appl. No.: 528,340

[52] U.S. Cl. ............................. 280/124 B; 267/57
[51] Int. Cl.² ................................... B60G 11/20
[58] Field of Search ..... 280/124 B, 104.5 R, 124 R; 267/57, 154

[56] References Cited
UNITED STATES PATENTS

| | | | |
|---|---|---|---|
| 2,684,237 | 7/1954 | Kayler | 280/124 B |
| 2,877,023 | 3/1959 | Shaffer | 280/104.5 R |
| 3,271,046 | 9/1966 | Evans | 280/124 B |
| 3,533,641 | 10/1970 | Driskill | 280/104.5 R |
| 3,606,373 | 9/1971 | Knott | 280/124 B |
| 3,737,173 | 6/1973 | Boissier | 280/124 B |

Primary Examiner—Philip Goodman
Assistant Examiner—John A. Carroll

[57] ABSTRACT

A suspension system for a trailer unit having two pairs of support axles providing independent wheel support, each of the wheels being mounted on torsion-type axles, with means for retracting at least one of the pairs of wheels thereby allowing the remaining pair to support the entire load and wherein the torsion supporting device is so designed to permit the remaining pair of wheels to be automatically, partially retracted thereby lowering the trailer to a predetermined above ground level with added means for further lowering the trailer by additional retraction of the remaining wheel set.

5 Claims, 2 Drawing Figures

U.S. Patent   March 16, 1976   3,944,248

3,944,248

SUSPENSION SYSTEM

FIELD OF THE INVENTION

This invention relates to vehicle suspension systems wherein independent suspension means are provided for each of the wheels and the position of the wheels may be shifted with respect to the frame of the vehicle thereby lowering or raising the frame with respect to the ground.

BACKGROUND AND OBJECTS OF THE INVENTION

Although an elevated position for trailers is essential for travel conditions, this position is often inconvenient for parked positions of the trailer and is often inconvenient for loading of the trailer.

Applicant provides herein a suspension system that is useable for many types of trailers and may find its most beneficial useage in what are known as camper trailers.

With the suspension system of applicant's device a trailer is properly elevated and properly supported for transport and thereafter may be lowered or if required, tilted for loading. The lowering permits a close ground relation and the tilting aids in the loading of equipment into the trailer.

It is therefore an object of applicant's invention to provide a suspension system for trailers and the like which permits the trailer to be elevated to a transport position and to be lowered to a parked, in use position.

It is a further object of applicant's invention to provide a suspension system for trailers and the like which permits shifting of the axle loading.

It is a further object of applicant's invention to provide a suspension system wherein the two sets of wheels are independently mounted and wherein the individual wheels of the sets are likewise individually mounted.

It is a further object of applicant's invention to provide a suspension system wherein control means are provided for elevating or retracting at least one set of axles whereby the remaining set of axles, due to the mounting provided therefore, will carry the weight of the trailer and will automatically retract to thereby lower the trailer.

It is still a further object of applicant's invention to provide a suspension system wherein control means are provided for controlled retraction of either one or both of the employed sets of axles and their carried wheel pairs.

Figure 2:
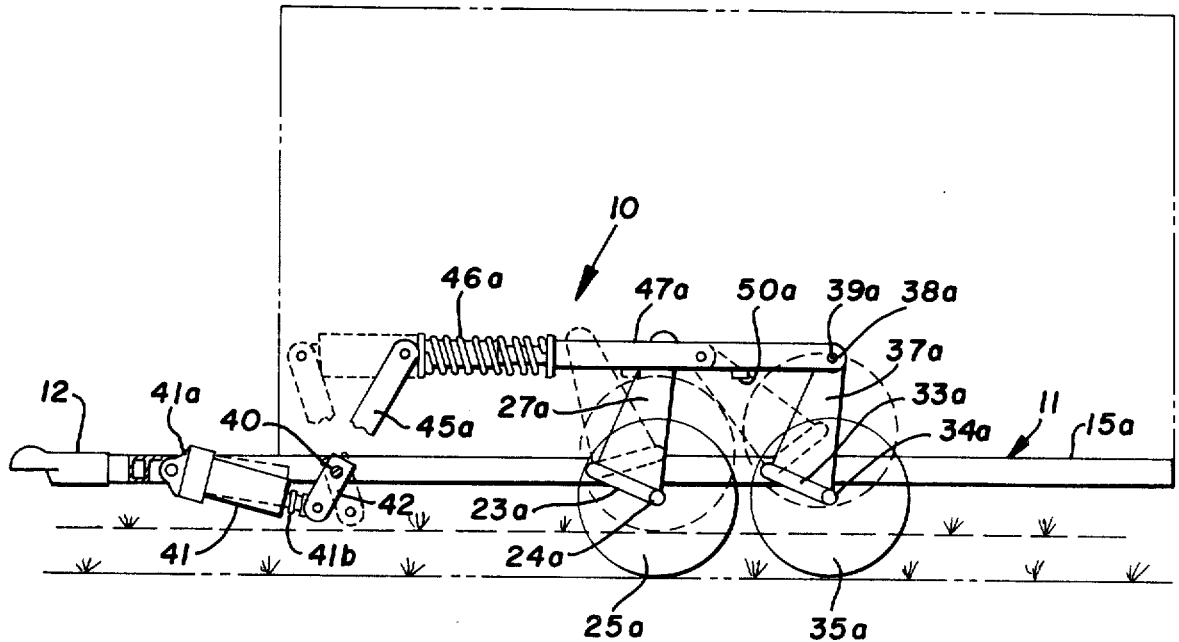

These and other objects and advantages of the applicant's invention will more fully appear from the accompanying drawings and description in which the same numerals are utilized to designate the same or similar parts throughout the several views and in which:

FIG. 1 is a top plan view of a suspension system embodying the concepts of applicant's invention having a suggested trailer body illustrated in dotted position over the frame of the system; and, FIG. 2 is a vertical section taken substantially along Line 2—2 of FIG. 1 and particularly illustrating the possible ground-height conditions and the wheels in the respective transport and rest positions.

In accordance with the accompanying drawings, the suspension system embodying the concepts of applicant's invention is generally designated 10 and is illustrated on a frame 11. The frame 11 is purely illustrative and it should be obvious that any frame could be modified and adapted for the mounting of the suspension system 10 thereon.

The frame employed herein includes a connecting tongue 12, a first set of outwardly and rearwardly extending elements 13a, 13b, a pair of inner bearing supporting, rearwardly extending elements 14a, 14b, a pair of outer supporting, rearwardly extending elements 15a, 15b and a plurality of transversely extending support elements 16, 17, 18. All of these elements are appropriately joined by welding or the like to provide a frame of sufficient strength and stability for supporting the desired load.

The suspension system 10 mounted on the frame 11 provides independent wheel mounting for the desired comfortable ride and this is obtained by providing independent mounting means for the wheels. Such an independent mounting, in the form shown includes a first forwardly oriented pair of axles 20a, 20b each being of the torsion type and therefore including a first transversely extending portion 21a, 21b with the inner ends received for rotation in a first bearing set 22a, 22b arranged on the inner support members 14a, 14b and extending transversely therefrom through the outer support members 15a, 15b to a first bell crank portion 23a, 23b and then again extending outwardly to a wheel mounting portion 24a, 24b upon which the first set of wheels 25a, 25b are mounted. The spring for the torsion concept is designated 26a, 26b and engages the axle portions 21a, 21b and the outer frame supports 15a, 15b.

A first control member is provided upon the respective bell crank portions 23a, 23b and extends, in the form shown, upwardly therefrom. This control member is designated 27a, 27b. The concept of this control member is, as will be further explained, to permit controlled retraction of this first wheel set if so desired.

The torsion effect of this first set of wheels is so designed to permit the automatic retraction thereof upon the full weight of the frame and trailer being placed thereon so that, as will also be explained, when the rear set of wheels is fully retracted, the first set will, bearing the full weight, be rotated upwardly to effectively lower the trailer frame and body height.

The suspension system also includes a second or rearwardly arranged pair of axles and wheels having substantially the same structure as the first pair. This rear pair includes a first transversely extending portion 31a, 31b, the entire axle units being designated 30a, 30b, with the inner ends thereof mounted in bearings 32a, 32b carried by the inner supports 14a, 14b and extending transversely outwardly therefrom through the outer supports 15a, 15b to a first bell crank portion 33a, 33b and then again extending outwardly to a wheel mounting portion 34a, 34b upon which this rear pair of wheels 35a, 35b are mounted. The spring for this torsion concept is designated 36a, 36b and engages the axles 30a, 30b and the outer frame supports 15a, 15b.

The control member for the rear pair of wheels is designated 37a, 37b and is provided with a connection aperture 38a, 38b at the upper end thereof to engage and receive a control pin 30a, 39b such that when the pin 39a, 39b is moved forwardly the rear wheels 35a, 35b will be elevated.

The means for elevating the wheels includes a first transversely extending, rotatably mounted shaft member 40 extending outwardly from the frame to have the ends 40a, 40b thereof in substantial alignment with the aforementioned control members 27a, 27b, 37a, 37b.

Means for actuating the shaft 40 include a pivotally mounted actuating member such as a hydraulic or electrically operated ram 41 having one end 41a thereof pivotally attached to the frame at, for example the tongue connecting portion of the frame, with the other end 41b thereof connected to an actuating yoke 42 rigidly attached to the shaft 40 for rotation thereof upon extension and retraction of the ram 41. The means of actuating the ram 41 may also include hand operated means such as a jack screw or the like.

A pair of upstanding lever elements 45a, 45b are fixedly attached to the outwardly extending portions of the shaft 40 for movement therewith and a shock absorbing biasing member and overload system is connected to the upper end thereof, such system being designated in its entirety 46a, 46b. Extending rearwardly from the overload system 46a, 46b, in the form shown, is a bifurcated arm structure 47a, 47b wherein one of the arms is arranged respectively on either side of the control members 27a, 27b, 37a, 37b such that the control members are properly and effectively located therebetween.

It should be brought out at this time that there is no positive connection between the front control members 27a, 27b and the bifurcated arm structure but that the rear control members 37a, 37b are positively connected to the bufircated arm structure 47a, 47b through the pins 39a, 39b and the receiving apertures 38a, 38b. The rear wheels then, being so positively connected, provide a spring system including not only the torsion spring assembly 36a, 36b but also include the overload structure 46a, 46b. In this manner, whenever the ram 41 is actuated there is a corresponding movement of the rear wheels.

The connection for desired movement for the front wheels 25a, 25b may take several forms depending upon the desired useage. In the form illustrated, a cross pin 50a, 50b is provided between the bifurcated arm structure 47a, 47b and this pin is spaced from the front control members 27a, 27b such that after a desired upward movement of the rear wheels 35a, 35b, the front wheels may also be elevated. With this type of structure, further lowering, in addition to the weight acting against the torsion springs of the front wheels is obtainable.

The utilization of applicant's independent axle and wheel arrangement is not impaired by the connection of the rear wheels to the lifting device. The rear wheels are free to move independently due the over load arrangement as the connection to the shaft 40 for rotation and lifting of the wheels is flexible to a degree, that degree being the control for raising and lowering these wheels.

The total independency of the wheels permits the wheels to essentially crawl over the terrain.

It should be obvious that applicant has provided a unique suspension system which allows completely independent movement of the wheels and still permits control of the same and such control providing a means for raising and lowering the unit for its various uses.

What I claim is:

1. A suspension system, including:
   a. a longitudinally extending frame member;
   b. a first pair of independently mounted wheel carrying axles rotatably mounted on a forward portion of said frame;
   c. a second pair of independently mounted wheel carrying axles rotatably mounted on said frame rearwardly of said first pair of axles;
   d. torsion spring, biasing means arranged on each of said axles;
   e. said wheel carrying axles including a bellcrank arrangement for mounting of said wheels on said axles;
   f. control means arranged on each of said axles for shifting thereof with respect to said frame member;
   g. said control means including a first control member arranged to selectively shift said bellcrank member of one of said pairs of wheel carrying members with respect to said frame, whereby one of said pairs of wheel carrying axles will be shifted to a non-load carrying position; and
   h. said torsion spring of said other pair of mounted axles is arranged and constructed to permit compression of said torsion spring and thereby lowering of said frame with respect thereto.

2. The structure set forth in claim 1 and said control means including a second control member for engagement with said bellcrank member of the other of said pairs of wheel carrying members for shifting of said bellcrank upon reaching a predetermined shifting of said one of said pairs of said wheel carrying members.

3. The structure set forth in claim 2 and said control means including means for biasing the movement of said first control movement with respect to the movement of said second control member, wherein said first control member movement is permitted over a certain degree of movement before second control member is engaged for movement of said second pair of wheel carrying axles.

4. The structure set forth in claim 1 and said control means arranged and constructed to simultaneously control the movement of one pair of said wheel carrying axles.

5. The structure set forth in claim 1 and said longitudinally extending frame member including an outer, longitudinally extending frame structure, an internal, extending frame structure, parallel with said outer frame structure, said axles extending through and bearingly mounted in said outer frame structure and having their inner ends thereof mounted for rotation on said internal frame structure.

* * * * *